March 19, 1946.  C. J. CRANE  2,396,687
AIRPLANE TURN INDICATOR
Filed Dec. 19, 1944
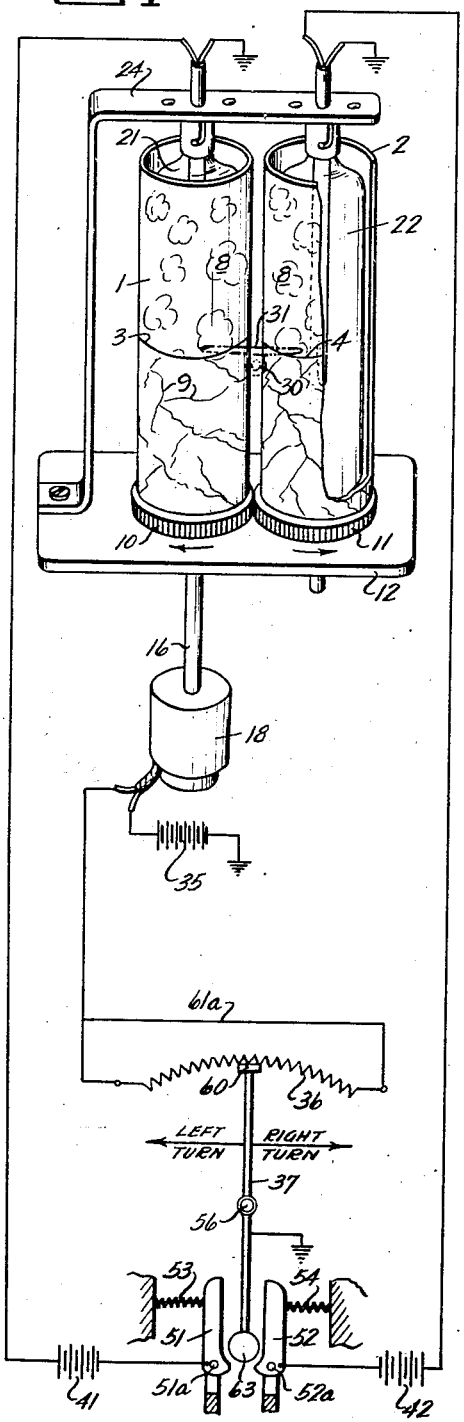
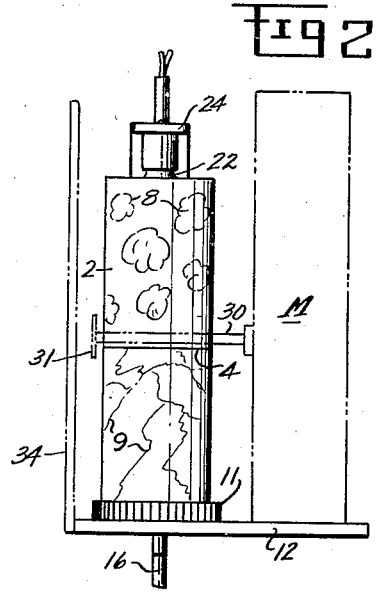
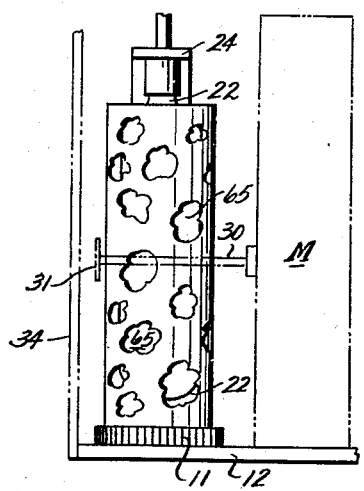
INVENTOR.
CARL J. CRANE
BY
ATTORNEYS Patented Mar. 19, 1946

2,396,687

UNITED STATES PATENT OFFICE 2,396,687

AIRPLANE TURN INDICATOR

Carl J. Crane, Sacramento, Calif.

Application December 19, 1944, Serial No. 568,911

10 Claims. (Cl. 33—204)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to turn indicating devices for airplanes, and more particularly, to devices having means for presenting an optical illusion to a pilot, of a universe comprising the surrounding sky and terrain moving relative to an airplane turning about a vertical axis.

In my prior United States Patent No. 2,283,190 there are disclosed several mechanisms for presenting an illusory effect to an airplane pilot to indicate to him relative motion of sky and terrain when his airplane is turning about a vertical axis. The structures of the prior patent comprise variously a plurality of rollers, or a plurality of revolving screens, on which appear miniature sky and terrain panoramas. The panorama-carrying members are normally stationary but adapted to revolve when the airplane starts to turn, in a direction opposite to the direction of turning of the airplane in order to simulate the effect of actual visibility of the relatively moving surrounding universe. In the construction just described the direction of rotation of the rotary members is physically reversed when the plane turns about its vertical axis from the left to the right directions, or vice versa, relative to the true line of flight, and, accordingly, the inertia of the moving parts of the mechanism in thus changing direction produces a delay or lag in the response of the panorama-carrying members.

The invention now to be disclosed constitutes an improvement of the system just described and has for its object the provision of a simple mechanism wherein the moving parts do not change direction when the airplane turns from the left to the right, or vice versa, relative its true line of flight, but are kept continuously in motion, the change of direction effect being obtained by means of selectively illuminating one or the other of the continuously moving elements to indicate a right or left direction of turn. Another object of the invention is to provide means whereby the rate of motion of the continuously moving element may be varied to correspond to the rate of turning of the airplane about its vertical axis.

In order to accomplish the objects of the invention I utilize a pair of translucent tubular cylinders, in one form of the invention, which are mounted for rotation in opposite directions and rotate continuously, carrying on their surfaces colored miniature representations of sky and terrain. Each cylinder encloses an electric lamp, the lamp in neither cylinder being lit when the airplane follows its true longitudinal course. However, should the airplane turn about the vertical axis, one or the other of the lamps will light, depending on the direction of turn of the airplane. An illusory effect is thus created by virtue of the rotation of the interiorly illuminated cylinder which creates the sensation of seeing an actual relative movement of the universe in the proper direction. Besides providing a suitable mechanism for obtaining the effect just described my device also incorporates means whereby the rate of rotation of the cylinders is varied to correspond to the rate of turn of the airplane, thus effectively realizing an integrating function.

For a more complete understanding of my invention reference will now be had to the accompanying drawing, in which Fig. 1 represents a front view of the rotating cylinders and the control mechanism therefor;

Fig. 2 is a side view thereof; and

Fig. 3 shows a modification of the rotating cylinders.

With reference to Figs. 1 and 2, a pair of translucent tubular members 1 and 2 are disclosed carrying thereon central dividing markings 3 and 4, respectively. Above the markings are miniature colored representations of clouds 8 and below the markings are miniature colored representations of terrain 9. The cylinders may be mounted as shown on a pair of intermeshing gears 10 and 11, having bearing means in a plate 12. Gear 10 has an extended shaft 16 adapted to be driven by the electric motor 18.

A pair of lamps 21 and 22 are secured interiorly of the cylinders 1 and 2 in any suitable manner, as by being suspended from a support member 24. The cylinders may be spaced apart a sufficient distance to permit the supporting shaft 30 of an airplane index member 31 to extend therethrough from index control means represented generally by M, for a purpose and effect well known in the prior art and fully disclosed in my prior patent referred to hereinabove. The index 31 cooperates with centrally disposed markings 3 and 4 which represent the horizon line between the sky and terrain representations, as will be understood by reference to my prior patent. If desired, a ground glass or diffusing screen 34 may be interposed in front of the cylinders 1 and 2.

The motor 18 may be energized as shown by a battery 35 through a resistance 36 acting in conjunction with a pivoted member 37, in a manner to be described, and the lamps 21 and 22 may be energized in the manner shown by batteries 41 and 42, respectively, through contact members 51 and 52, respectively, acting in conjunction with the pivoted member 37 in a manner to be described, it being noted that contact members 51 and 52 are themselves pivoted at their lower portions at 51a and 52a, respectively, and are provided with springs 53 and 54, respectively, for bias toward the member 37.

Particular attention is now called to the member 37 which is pivoted at its central portion 56, as shown, and has at one end thereof a brush 60 adapted to slidably contact the arcuately arranged resistance coils 36. The other end of member 37 is provided with a contact button 63 which is adapted to engage either of the adjacent surfaces of contact members 51 and 52, dependent on the direction of rotation of member 37 about its pivot. A force tending to rotate 37 in either direction, as indicated by arrows designated "Right turn" and "Left turn," responsive to turning of an associated aircraft about its vertical axis may be provided by a turn gyroscope (not shown) installed in the associated aircraft. The turn gyroscope may be coupled to member 37 in any suitable manner such as by a mechanical linkage or by the use of Autosyns, as disclosed in the prior art, the specific means not forming part of the present invention.

It will be noted that the resistance 36 is short-circuited, the short-circuiting connection being connected to motor 18 which is connected through the battery 35 to ground. Since the member 37 likewise is grounded, it will be understood that current is continuously supplied to the motor 18 whereby a continuous rotation of cylinders 1 and 2 is provided in opposite directions by virtue of the gears 10 and 11. However, a pivotal displacement of member 37 will cause the brush 60 to move clockwise or counterclockwise from the centrally disposed position shown on Fig. 1, thus reducing the amount of resistance 60 in the motor circuit whereby the motor 18 will speed up. This effect occurs regardless of the direction of rotation of member 37 from the central position, the speed increase obviously depending on the degree of displacement of member 37.

From consideration of the central position of member 37 in Fig. 1, it will be seen that contact button 63 is intermediate the contact members 51 and 52 no contact being made between 63 and either of the contact members 51 and 52 at this time.

In operation, should a pivotal displacement be brought to bear on the member 37 by gyroscopic action in the event that the airplane begins to turn about its vertical axis, contact will be made between contact button 63 and one or the other of the contact members 51 and 52, depending on the direction of torque exerted on member 37 which is, of course, dependent upon the direction of turn of the airplane. Simultaneously the brush 60 will be displaced from its centrally disposed position and will cause a decreasing resistance to current flow as it approaches either of the terminals of the resistance 36 depending on the degree of displacement of member 37, whereby the speed of motor 18 will increase correspondingly.

Owing to the pivotal support provided members 51 and 52 and to the spring bias provided these members, contact engagement between button 63 and contact member 51 or 52 will be maintained throughout the entire arc of travel of member 37 whereby one or the other of lamps 21 and 22 will be lit as long as member 37 is displaced from its central position, by virtue of current from the battery 41 or 42, respectively, through a circuit clearly understandable from consideration of Fig. 1 and depending on the direction of rotation of member 37.

Assuming that the aircraft on which the device is mounted is beginning to turn to the left and that the pilot is viewing the cylinders 1 and 2 from the reader's viewpoint, the force exerted on member 37 will then be such as to cause a counterclockwise motion thereof, indicated by the "Left turn" arrow, and contact of button 63 with contact member 52 is effected almost immediately, any time delay being dependent, as a design matter, on the closeness arranged for between the aforesaid elements. Accordingly, lamp 22 will be lit while lamp 21 remains unlit. The cylinder 2, which has been continuously rotating in the direction of the associated arrow, is now interiorly illuminated and the pilot watching the rotation thereof experiences the illusory effect of seeing the surrounding universe moving relative the airplane to the right whereby he senses the fact that the airplane is moving to the left.

As the rate of turn increases the pivotal displacement of member 37 likewise increases, more current flowing in the circuit of motor 18 as brush 60 approaches the left terminal of resistance 36, thereby speeding up the rate of rotation of the cylinders 1 and 2 whereby the pilot becomes visually cognizant of the rate of turning of the illuminated cylinder corresponding to the rate of turning of the aircraft. In the event that the airplane turns toward the right about its vertical axis the device operates in a similar manner, cylinder 1 then being illuminated while cylinder 2 is dark since the member 37 carrying the contact button 63 then moves clockwise to establish contact with contact member 51 to light lamp 21, the rate of rotation of cylinders 1 and 2 being simultaneously varied the same as before except that contact brush 60 now approaches the right terminal of resistance 36.

In the modification of Fig. 3, cloud effects are produced by perforations 65 in the walls of the cylinders which are composed of opaque material. The rays of light from the lamps pass through perforations 65 and are permitted to impinge directly on the screen 34 and appear as illuminated cloud shapes moving to the right or the left depending on whether the lamp 21 or 22 is lit.

It will be seen that I have provided a device of the class described wherein inertia effects of certain mechanical members have been substantially eliminated and I seek the protection of United States Letters Patent within the scope of the claims herein appended.

I claim:

1. In a flight indicator for aircraft, a pair of oppositely rotating tubular translucent members having a cloud and terrain pattern disposed thereon, means for providing illumination in the interior of one or the other of said members in response to turning of an associated aircraft depending on the direction of turn, and means for controlling the speed of rotation of said members to correspond to the rate of turn of said associated aircraft for the purpose of creating an optical effect simulating actual visibility of sky and terrain during turning motion of said aircraft.

2. In a flight indicator for aircraft, a pair of normally deenergized illumination sources, means for energizing one of said sources responsive to turning motion of an associated aircraft depending upon the direction of turn, a pair of members, each of which is adapted to be illuminated by one of said sources, means providing continuous motion of said members at a rate depending upon the rate of turn of said aircraft, and means associated with said members for creating an optical effect of turning motion of said aircraft when one of said members is illuminated by an energized illumination source.

3. In a flight indicator for aircraft, a pair of normally deenergized illumination sources, means for energizing one of said sources to provide illumination therefrom responsive to turning motion of an associated aircraft depending upon the direction of turn, continuously moving means having an optical pattern thereon of which a portion is adapted to represent turning of said aircraft in one direction and another portion is adapted to represent turning of said aircraft in the opposite direction, one of said portions being illuminated by one of said illumination sources when said aircraft is turning in one direction and the other of said portions being illuminated by the other of said illumination sources when said aircraft is turning in the opposite direction, thereby creating an optical effect simulating actual visibility of the surrounding universe during turning motion of said aircraft.

4. A device as set forth in claim 3 including means for controlling the rate of motion of said continuously moving means to correspond to the rate of turn of said aircraft.

5. A device as set forth in claim 3 including a motor for providing mechanical power to maintain motion of said continuously moving means and rate control means for controlling the speed of said motor comprising means adapted to be gyroscopically actuated responsive to turning motion of said aircraft to a degree depending on the rate of turning thereof, and illumination control means adapted to be gyroscopically actuated to energize one or the other of said illumination sources depending on the direction of turn of said aircraft.

6. In a flight indicator for aircraft, a pair of normally deenergized illumination sources, means for energizing one of said sources to provide illumination therefrom responsive to turning motion of an associated aircraft depending upon the direction of turn, continuously moving means having an optical pattern thereon of which a portion is adapted to represent turning of said aircraft in one direction and another portion is adapted to represent turning of said aircraft in the opposite direction, one of said portions being illuminated by one of said illumination sources when said aircraft is turning in one direction and the other of said portions being illuminated by the other of said illumination sources when said aircraft is turning in the opposite direction, thereby creating an optical effect simulating actual visibility of the surrounding universe during turning motion of said aircraft, including a motor for providing mechanical power to maintain motion of said continuously moving means and rate control means for controlling the speed of said motor comprising means adapted to be actuated by a gyroscopic device installed in said aircraft responsive to turning thereof and to a degree depending on the rate of turning thereof and illumination control means adapted to be actuated by a gyroscopic device installed in said aircraft and adapted to energize one or the other of said illumination sources depending on the direction of turn of said aircraft, said rate control means and said illumination control means comprising a normally centrally positioned member mounted for motion in one direction or the other by gyroscopic action depending upon the direction of turn of said aircraft to a degree corresponding to the rate thereof, and means disposed at one end of said member and cooperative therewith to vary the speed of said motor corresponding to the degree of motion of said member and means disposed at the opposite end of said member to energize one or the other of said illumination sources upon motion of said member from said central position and to maintain said energization during the time for which said member is displaced from the normal central position thereof.

7. A device as set forth in claim 3 including an electric motor providing mechanical power to maintain the position of said continuously moving means, said illumination sources comprising electrical lamps and means for varying the speed of said motor and for simultaneously energizing one or the other of said lamps comprising a normally centrally disposed member pivoted for rotary displacement and adapted to be rotatably displaced in clockwise or counterclockwise direction from said central position by a gyroscopic device installed in said aircraft and to a degree dependent upon the rate of turn of said aircraft and means disposed for coaction with said member and comprising a variable impedance for controlling the speed of said motor to a degree corresponding to the degree of rotary motion of said member, and contact means disposed to coact with said member and operable by rotary displacement thereof from said central position to energize one or the other of said lamps depending on the turn direction of said aircraft and to maintain said energization while said member is displaced from said central position.

8. A device as set forth in claim 1 wherein said tubular members are disposed in axially parallel side-by-side relation and spaced apart sufficiently to permit passage therebetween of an index supporting means, and gear means at corresponding ends of said tubular members and secured thereto and adapted for engagement whereby rotary actuation of said gear means is operative to rotate said tubular members in opposite directions.

9. A device as set forth in claim 1, wherein said illumination means comprises elongated electric lamps disposed coaxially with and extending substantially the length of said tubular members in the interior thereof.

10. In a flight indicator for aircraft a pair of continuously moving members of opaque material having cloud patterns perforated therethrough, means disposed at one side of said members providing illumination therethrough responsive to direction of turn of an associated aircraft, and a diffusing screen means on the opposite side of said members and adapted to be viewed by the operator of said aircraft whereby said patterns will appear as illuminated areas in motion on said diffusing screen responsive to turning of said aircraft.

CARL J. CRANE.